United States Patent [19]
Agata

[11] Patent Number: 5,511,950
[45] Date of Patent: Apr. 30, 1996

[54] VACUUM PUMPS FOR RECOVERING CONDENSATES FROM STEAM-USING APPARATUS

[75] Inventor: Akihiko Agata, Isahaya, Japan

[73] Assignee: Shin-Ei Kabushiki Kaisha, Isahaya, Japan

[21] Appl. No.: 285,450

[22] Filed: Aug. 5, 1994

[51] Int. Cl.$^6$ ................................................. F04F 5/54
[52] U.S. Cl. ......................... 417/36; 137/391; 417/182.5; 417/79
[58] Field of Search .................... 137/91, 92; 417/36, 417/182.5, 79

[56] References Cited

U.S. PATENT DOCUMENTS

| | | | |
|---|---|---|---|
| 2,336,205 | 12/1943 | Willauer | 137/391 X |
| 3,599,666 | 8/1971 | Curtis et al. | 137/391 |
| 3,714,823 | 2/1973 | Wilkens et al. | 137/391 X |
| 4,556,018 | 12/1985 | Agata . | |
| 4,662,390 | 5/1987 | Hawkins | 137/392 |

FOREIGN PATENT DOCUMENTS 64-46500  3/1989  Japan .

*Primary Examiner*—Richard E. Gluck
*Attorney, Agent, or Firm*—Oblon, Spivak, McClelland, Maier & Neustadt

[57] ABSTRACT

A condensate recovering vacuum pump uses the condensate in a condensate tank as the boiler feed water. A circulating pump supplies the feed water to the feed-water ejection nozzle of a jet pump. The condensate collected from the steam trap of the steam-using equipment is returned to the condensate tank together with the feed water. The penstock of a tank water level gauge is connected to the condensate tank through a throttle orifice while the upper part of the penstock is connected to the condensate tank 14 through an equalizing pipe. Water-level sensors to detect the water levels required for control are provided in the penstock. The condensate recovered by the jet pump from the trap of the steam-using equipment contains leaked steam and residual air in the piping. The vacuum pump with the above provisions always assures detection of the correct mean value of the water level in the condensate tank by keeping the water level gauge immune to the influence of the pressurized gas from the jet pump even if the gush of the pressurized gas may temporarily raise the pressure in the space above the water surface in the condensate tank.

5 Claims, 3 Drawing Sheets

5,511,950

VACUUM PUMPS FOR RECOVERING CONDENSATES FROM STEAM-USING APPARATUS

FIELD OF THE INVENTION

This invention relates to vacuum pumps for recovering liquid condensates from steam heaters, heat exchangers, air conditioners and other apparatuses which use steam supplied from steam boilers, and more particularly to vacuum pumps that can steadily detect the mean value of the water level in the liquid condensate tank that temporarily holds liquid condensates.

DESCRIPTION OF THE PRIOR ART

Some apparatuses that use steam supplied from a steam boiler are designed to recover the steam after use. In an apparatus of this type, more specifically, a vacuum pump recovers the condensed steam from a steam trap and sends the recovered condensate back into the steam boiler.

Here it should be noted that the condensed steam from the steam trap is usually at as high a temperature as between approximately 90° and 110° C. This hot condensate, if recovered directly into the vacuum pump, might evaporate again or, otherwise, cause the raw steam leaked from the steam trap of air remained in the piping to flow into the vacuum pump, which could lead to malfunction or failure of the pump.

Japanese Provisional Utility Model Publication No. 46500 of 1989 discloses a condensate recovering vacuum pump that provides a solution for the problem just described. This pump is connected to a boiler and a condenser or other apparatus using steam, as will be described later by reference to FIG. 1. A jet pump in this vacuum pump collects the condensate produced in the steam-using apparatus into a tank and sends the collected condensate back into the boiler as makeup water.

However, the jet pump of this vacuum pump not only collects the condensate from the steam-using apparatus but also entrains leaked steam and/or residual air in the piping. A mixed stream of the leaked steam and residual air gushes out from the jet pump into the condensate tank at atmospheric pressure. An explosive gush of this largely gaseous mixture under pressure causes temporary pressure changes or large waves at the surface of the liquid in the condensate tank. Let us assume that the penstock of a water gage is connected to a point of a condensate tank that is below the minimum allowable water level therein for the detection of the water level by water-level sensors connected thereto. The pressure changes in water due to the pressure changes or waves at the surface force the condensate to flow into and out of the penstock repeatedly. Then, the water gage is unable to determine the correct water level in the tank. As the output from the water gage is used as a signal for the control of the a vacuum pump, such a wrong feedback can cause a malfunction of the control system.

SUMMARY OF THE INVENTION

This invention eliminates the above shortcomings in conventional condensate recovering vacuum pumps. An object of this invention is to provide a condensate recovering vacuum pump that always assures detection of the correct mean value of the water level in a condensate tank by keeping a water gage connected thereto immune to the influence of large waves caused in the condensate tank by the leaked steam or residual air contained in the condensate collected from the trap of steam-using apparatus. Another object of this invention is to provide a condensate recovering vacuum pump that always assures detection of the correct mean value of the water level in a condensate tank by keeping a water gage connected thereto immune to the influence of a temporary rise in the pressure in a space above the water in the condensate tank or of the condensate caused by the gas or liquid gushing from the jet pump under pressure.

Still another object of this invention is to provide a condensate recovering vacuum pump of simple construction that always assures detection of the correct mean value of the water level in a condensate tank.

In order to achieve the above objects, a condensate recovering vacuum pump according to this invention comprises a condensate tank that temporarily holds the condensate, a circulating pump that supplies the condensate from the condensate tank to a feedwater injection nozzle of the jet pump described next, and a jet pump that creates a negative pressure at a port through which the condensate is taken in by injecting the feedwater, sucks the condensate through the condensate inlet port connected to a steam trap of a steam-using apparatus, and delivers the condensate together with the feedwater through a discharge port into the condensate tank. The penstock of a tank water-level gauge is connected through a throttle orifice to a point on the condensate tank that is lower than the minimum allowable water level therein. The upper part of the penstock is connected to a point on the condensate tank above the maximum allowable water level in the condensate tank through an equalizing pipe. Water-level sensors to detect the water level in the condensate tank are provided in the penstock.

The equalizing pipe interposed between the penstock and condensate tank may serve as a support for the upper part of the penstock.

The condensate recovering vacuum pump may be equipped with water-level sensors that work when the water level in the condensate tank is at a lower level at which makeup water must be fed and at a higher level at which the feed of makeup water must be stopped. A makeup-water control solenoid valve that is actuated by a signal from the water-level sensor, opening when the water level in the condensate tank is low and closing when the water level is high, may also be attached to the feed that supplies makeup water to the condensate tank.

Multiple condensate recovering vacuum pumps may be provided at multiple points where condensates are produced, and the condensates collected thereby are returned to one boiler. In this case, a return-water tank may be provided midway on a feed pipe to return the condensate from the condensate tank to the boiler. A feed pump that is actuated by a signal from the water-level sensor, working when the water level in the tank is high and stopping when the water level is low, may be connected to the reflux tank.

When feedwater under high pressure is supplied from the circulating pump to the jet pump nozzle of a condensate recovering vacuum pump of the type just described, a negative pressure develops in the vacuum chamber, whereupon the condensate is drawn in through the inlet port and delivered in to the tank, together with the feedwater, through the discharge port. In this instance, the jet pump admits not only the condensate from the steam-using apparatus but also the leaked steam and residual air in the piping. The gush of the gas-and-liquid mixture into the condensate tank causes temporary pressure changes or large waves at the surface of the liquid in the condensate tank, mainly as a result of the explosive inflow of gases under pressure. The resulting pressure changes at or under the surface of the condensate in the tank prevents a simple conventional water-level gauge whose penstock is connected to a condensate tank and water-level sensors from detecting the correct level of water in the tank. However, the throttle orifice provided between the condensate tank and the penstock of the water-level gauge controls the flow of water leaving and entering the penstock, which, in turn, reduces the variations in the water level in the penstock. When the upper part of the penstock is connected to a point on the condensate tank above the maximum allowable water level therein through the equalizing pipe, the pressure in the upper part of the penstock quickly becomes equal to that at the surface of the water in the condensate tank even if the gush of the pressurized gas from the jet pump may temporarily raise the pressure in the space above the water surface in the condensate tank. This also decreases the amount of water flowing through the throttle orifice. As a consequence, the water-level sensors can stably detect the mean value of the water level in the condensate tank.

DESCRIPTION OF PREFERRED EMBODIMENTS

Figure 1:
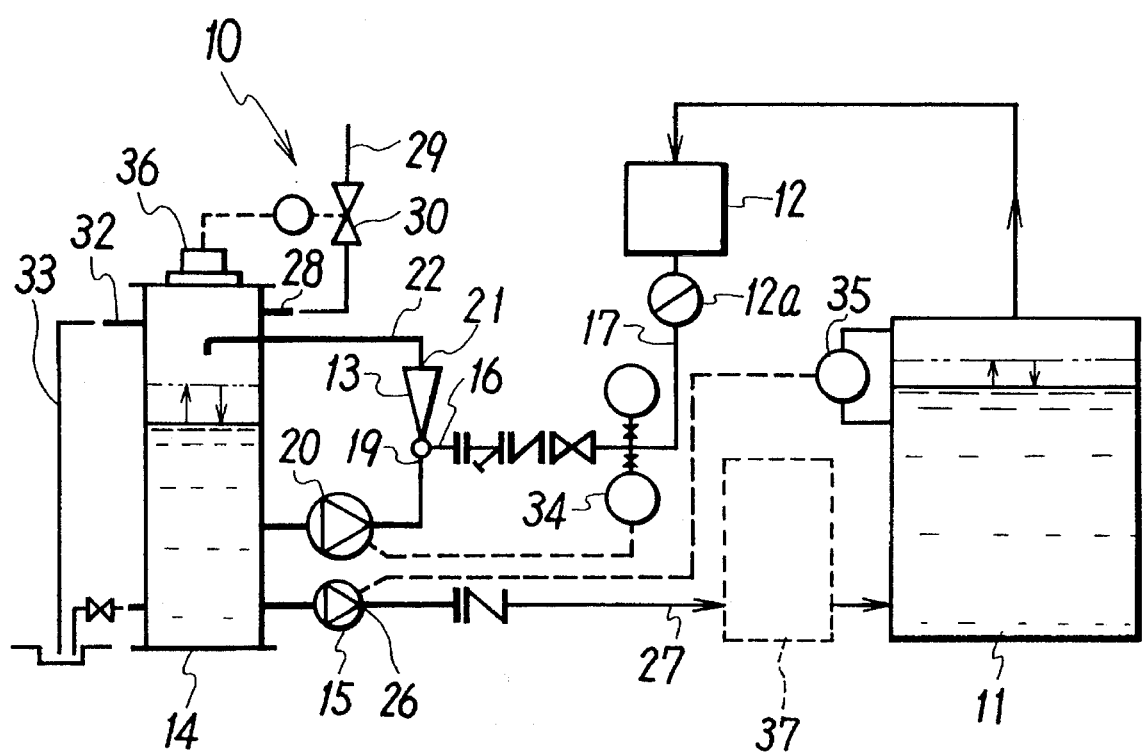
FIG. 1 is a block diagram showing a condensate recovering vacuum pump of this invention in use.

Connected to a boiler 11 and an apparatus 12, such as a condenser, that uses steam from the boiler 11, a condensate recovering vacuum pump of this invention designated by reference numeral 10 in FIG. 1 recovers the condensate produced in the steam-using apparatus 12 into a condensate tank 14 open to the atmosphere by means of a jet pump 13 and delivers the collected condensate back into the boiler 11 as the makeup water by means of a feed pump 15.

The way the condensate recovering vacuum pump 10, boiler 11 and steam-using apparatus 12 are connected will be described, together with the construction of the vacuum pump 10 shown in FIGS. 2 and 3. The jet pump 13 in the vacuum pump 10 has a condensate inlet port 16 that is connected to a trap 12a of the steam-using apparatus 12 through a suction pipe 17. The feed orifice 19 of a feedwater jet nozzle 18 is connected to the exhaust port of a circulating pump 20. The high-pressure feedwater from the circulating pump 20 is ejected through the nozzle 18 to create a negative pressure at the condensate inlet port 16. Then, the condensate from the trap 12a is drawn in through the inlet port 16 and discharged, together with the feed-water, through the exhaust port 21.

A reflux pipe 22 connected to the side of the condensate tank 14 connects the exhaust port 21 to a space therein filled with gas. The leading end of the reflux pipe 22 opens downward in the condensate tank 14. As is obvious from FIG. 3, two circulating pumps 20 are provided, one in front and the other at the back of the condensate tank 14, with one maintained as a spare. The feed orifice 19 is branched and connected to the exhaust port of each circulating pump 20 through a feedwater pipe 23 and a check valve 24. The inlet ports of the two circulating pumps 20 are connected to the lower end of a space of the condensate tank 14 filled with liquid through joints 25 projecting from the front and rear surfaces of the condensate tank 14.

Like the circulating pumps 20, two feedwater pumps 15 are provided, with one on stand-by. The exhaust ports 26 of the two feedwater pumps 15 are connected to the boiler 11 through feedwater pipes 27.

The condensate tank 14 has a makeup water port 28 that is connected to a source of makeup water through a makeup water feed pipe 29 having a solenoid valve 30 and an overflow port 30 that is connected to an overflow pipe 31. The signals from a vacuum switch 34 provided on the suction pipe 17 actuate the circulating pump 20 when the vacuum at the condensate inlet port 16 is low and stop it when the vacuum thereat is high. The signals from a boiler level gauge 33 actuates the feedwater pump 15 when the water level in the boiler 11 is low and stops it when the water level therein is high. The signals from a tank level gauge 36 opens the makeup-water control solenoid valve 30 when the water level in the condensate tank 14 is low and closes it when the water level therein is high.

Multiple condensate recovering vacuum pumps may be provided at multiple points where condensates are produced, and the condensates collected thereby are returned to one boiler. In this case, a reflux tank 37 to hold all of the condensate to be returned to the boiler 11 may be attached to the boiler 11, as indicated by the dotted line halfway through the length of the feed pipe 27 in FIG. 1. Then, the feed pump 15 sends any excess condensate in the condensate tank 14 to the reflux tank 37. The feed pump 15 is then controlled to work when the water level in the condensate 14, which is detected by the water-level gauge 36, is high and stop when the water level is low. This control can, of course, be applied in conjunction with the control of the makeup-water control solenoid valve 29 by the water-level gauge 36 mentioned earlier.

Figure 2:
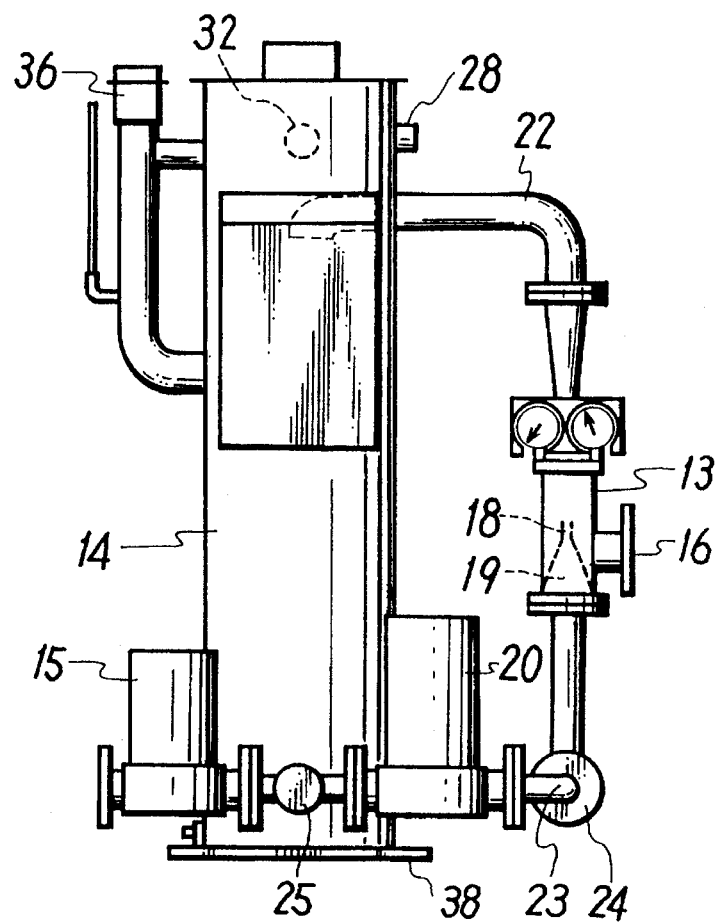
FIG. 2 is a front view showing an embodiment of the condensate recovering vacuum pump according to this invention.
Figure 3:
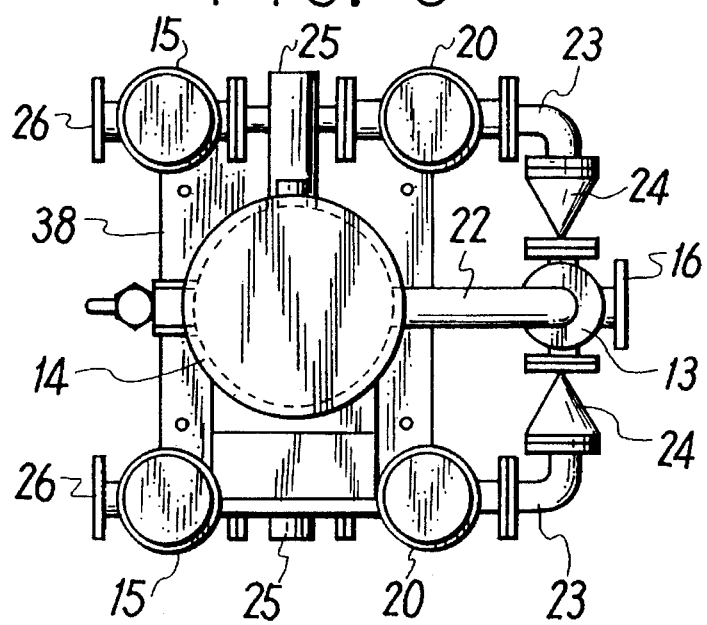
FIG. 3 is a plan view of the same embodiment.

As explicitly illustrated in FIGS. 1 and 2, the condensate tank 14 in the condensate recovering vacuum pump 10 is a cylindrical receptacle placed in an upright position on a seat 38. To the side of the condensate tank 14 whose inside is kept at normal pressure are connected the jet pump 13 to draw in the condensate, two circulating pumps 20 to supply the feedwater to the jet pump 13, and two feedwater pumps to supply the condensate from the condensate tank into the boiler 11 through pipes.

In the condensate recovering vacuum pump just described, the steam generated in the boiler 11 is sent first to the steam-using apparatus for the liberation of heat, and then to the steam trap 12a for condensation. When the feedwater at high pressure is supplied from the circulating pump 20 to the feed orifice 19 of the jet pump 13, a negative pressure develops at the condensate inlet port 16, whereupon the condensate is drawn from the steam trap 12a through the suction pipe 17 and then collected from the exhaust port 21, together with the feedwater, into the condensate tank 14 through the reflux pipe 22.

Because the condensate tank 14 is vertically long and the circulating pumps 20 are connected to the lower end of the water-filled zone therein, the pressure head therein prevents pressure drop in the vicinity of the inlet port of the circulating pump 20 and significantly lowers the chance of cavitation. The heat release in the condensate tank 14 at normal pressure lowers the temperature of the hot condensate collected therein. Then, the cooled condensate moves to the lower part of the condensate tank 14 by convection. The jet pump 13 thus supplied with the cooled condensate as the feedwater works very efficiently.

Although the embodiment just described has two circulating pumps 20 and two feedwater pumps 15, their number may be reduced to one each.

Figure 4:
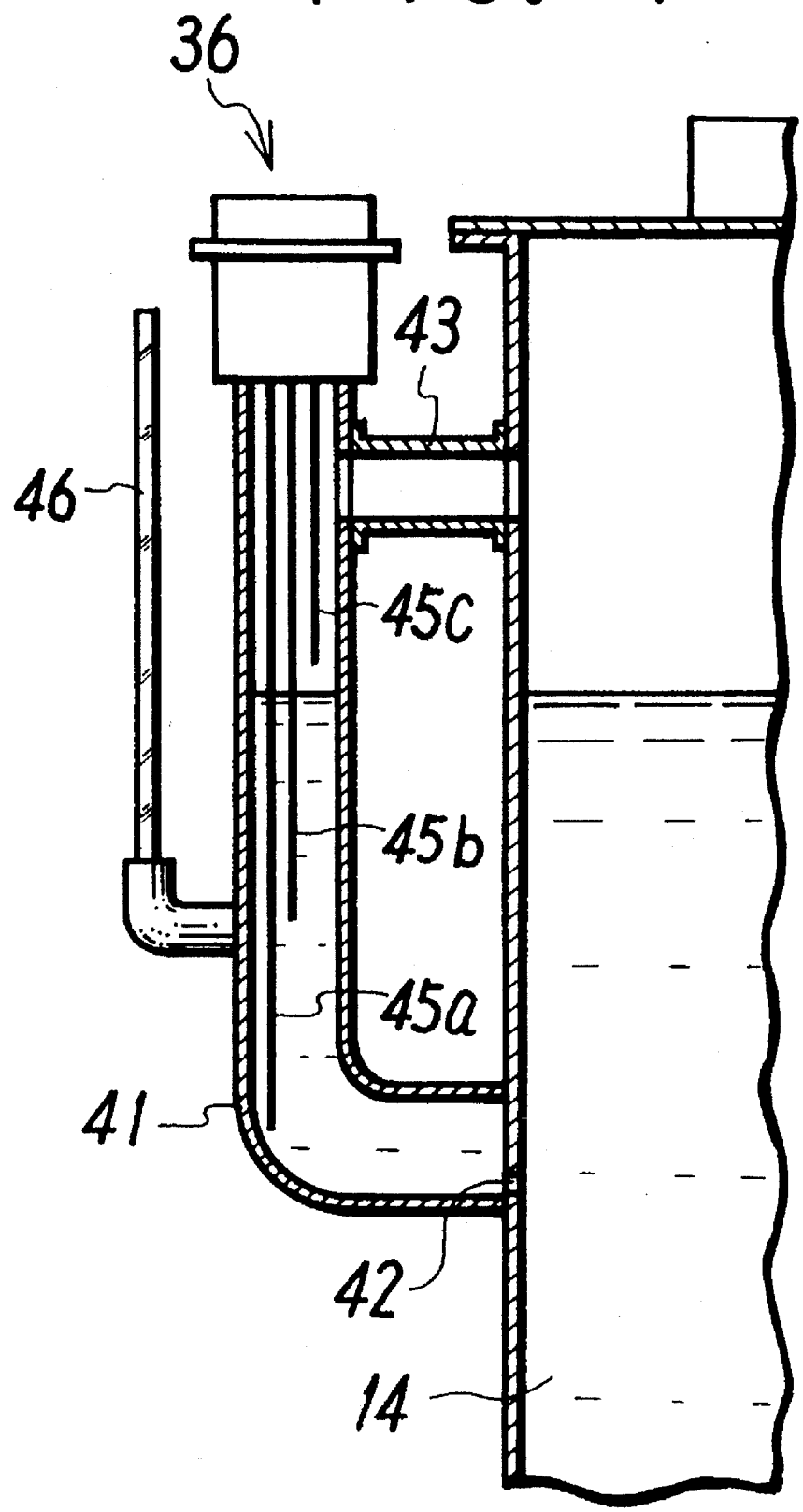
FIG. 4 is a partially cross-sectional view showing details of a water-level gauge used in the condensate recovering vacuum pump according to this invention.

FIG. 4 shows details of the construction of the water-level gauge 36 used with the condensate recovering vacuum pump 10 described above.

The water-level gauge 36 shown in FIG. 4 has a penstock 41 that which is connected through a throttle orifice 42 to a point on the condensate tank 14 that is below the minimum allowable water level therein, with the upper part thereof connected through an equalizing pipe 43 to a point on the condensate tank 14 that is above the maximum allowable water level therein. The penstock 41 contains at least two water-level sensors to detect at least two different water levels. The penstock shown in FIG. 4 contains three water-level sensors 45a, 45b and 45c.

The equalizing pipe 43 supports the upper part of the penstock 41. This support securely holds the penstock 41 in place. The penstock 41 has a transparent water-level indication tube 46 to permit visual inspection of the water level.

The water level sensors 45a, 45b and 45c are of the electrode type that detect the electricity conducted when an electrode suspended in the penstock 41 comes in contact with the water surface. Other water-level sensors of known types, such as that detects the water level through changes in the capacitance of the pole plate disposed opposite the water surface or an analog gauge that detects the water level as an analog output of a float switch that opens and closes an electric circuit by means of a float or a strain gauge whose output changes with the displacement of a float or other element.

The water-level gauge 36 must have at least two water-level gauges. One water-level sensor 45a is designed to work when the water level in the condensate tank 14 drops to a level at which the supply of makeup water becomes necessary. Another water-level sensor 45b is designed to work when the water level becomes high enough to stop the supply of makeup water. The makeup-water control solenoid valve 30 on the makeup water feed pipe 29 is connected to a control circuit so that the condensate tank 15 opens at the lower water level detected by the sensor 45a and closes at the higher water level detected by the sensor 45c.

The jet pump in this type of condensate recovering vacuum pump admits not only the condensate from the steam-using apparatus but also leaked steam and residual air in the piping when pressurized feedwater is supplied from the circulating pump 20 to the nozzle thereof. Then, the gush of the gas-and-liquid mixture into the condensate tank causes temporary pressure changes or large waves at the surface of the liquid in the condensate tank, mainly as a result of the explosive inflow of gases under pressure.

However, the throttle orifice 42 through which the penstock 41 of the water level gauge 36 is connected controls the flow of water passing therethrough, thereby decreasing variations in the water level in the penstock 41. When the upper part of the penstock 41 is connected to a point on the condensate tank 14 above the maximum allowable water level the rein through the equalizing pipe 43, the pressure in the upper part of the penstock 41 quickly becomes equal to that at the surface of the water in the condensate tank 14 even if the gush of the pressurized gas from the jet pump 13 may temporarily raise the pressure in the space above the water surface in the condensate tank 14. This also decreases the amount of water flowing through the throttle orifice 42. As a consequence, the water-level sensors 45a, 45b and 45c can stably detect the mean value of the water level in the condensate tank 14.

What is claimed is:

1. A condensate recovering vacuum pump comprising a condensate tank for temporarily holding condensate, a circulating pump for supplying collected condensate from the condensate tank to a feedwater nozzle of a jet pump as feedwater, and the jet pump creates a negative pressure at a condensate inlet port through which the condensate is taken in by injecting the feedwater, sucks the condensate through the condensate inlet port connected to a steam trap of a steam-using apparatus, and delivers the condensate together with the feedwater through a discharge port into the condensate tank, the condensate recovering vacuum pump further comprises:

a water-level gauge having a penstock which is connected through a throttle orifice to a point of the condensate tank that is lower than a minimum allowable water-level therein, said penstock upwardly extending on an outside of the condensate tank;

an upper part of the penstock being connected through an equalizing pipe to a point of the condensate tank that is higher than a maximum allowable water-level therein; and electrode-type water-level sensors are provided in the water-level gauge to detect water-levels, said water-level sensors detect electricity conducted when an electrode of the sensors comes into contact with water.

2. A vacuum pump according to claim 1, in which the equalizing pipe serves as a support for the upper part of the penstock.

3. A vacuum pump according to claim 1 or 2, wherein:

the water-level sensors are provided to work at a lower water-level at which a supply of makeup water becomes necessary and at a higher water-level at which the supply of makeup water must be stopped; and a makeup-water control solenoid valve is provided in a feed pipe to supply the makeup water to the condensate tank, the solenoid valve being actuated by signals from the water-level sensors to open when the water-level in the condensate tank is low and close when the water-level is high.

4. A vacuum pump according to claim 1 or 2, wherein:

the water-level sensors are provided to function when the water-level in the condensate tank reaches lower and higher limits; and a feed pump provided on a feed pipe to send the condensate from the condensate tank to a reflux tank attached to a boiler, the feed pump being actuated by signals from the water-level sensors to work when the water-level in the condensate tank is high and stop when the water-level is low.

5. A vacuum pump according to claim 1, wherein the water-level gauge is separated from the condensate tank.

* * * * *